US012779613B2

(12) United States Patent
Horibe et al.

(10) Patent No.: US 12,779,613 B2
(45) Date of Patent: Nov. 3, 2026

(54) MACHINE TOOL, DIAGNOSIS SYSTEM FOR MACHINE TOOL, AND METHOD OF DIAGNOSING MACHINE TOOL

(71) Applicant: Yamazaki Mazak Corporation, Niwa-gun (JP)

(72) Inventors: Kazuya Horibe, Niwa-gun (JP); Osamu Aoyama, Niwa-gun (JP); Yukihiko Saga, Niwa-gun (JP); Hiromasa Yamamoto, Niwa-gun (JP); Hyunkoo Park, Niwa-gun (JP); Jumpei Kitayama, Niwa-gun (JP)

(73) Assignee: YAMAZAKI MAZAK CORPORATION, Niwa-gun (JP)

( * ) Notice: Subject to any disclaimer, the term of this patent is extended or adjusted under 35 U.S.C. 154(b) by 430 days.

(21) Appl. No.: 18/477,487

(22) Filed: Sep. 28, 2023

(65) Prior Publication Data

US 2024/0017367 A1 Jan. 18, 2024

Related U.S. Application Data

(63) Continuation of application No. PCT/JP2021/014008, filed on Mar. 31, 2021.

(51) Int. Cl.

*B23Q 17/09* (2006.01)
*B23Q 17/12* (2006.01)
(Continued)

(52) U.S. Cl.

CPC ......... *B23Q 17/0971* (2013.01); *B23Q 17/12* (2013.01); *G05B 19/406* (2013.01);
(Continued)

(58) Field of Classification Search

CPC .. B23Q 17/0971; B23Q 17/12; G05B 19/406; G05B 19/4145; G05B 23/0221;
(Continued)

(56) References Cited

U.S. PATENT DOCUMENTS

2008/0234964 A1 9/2008 Miyasaka et al.
2019/0242787 A1* 8/2019 Suzuki ................ G07C 5/0825
(Continued)

FOREIGN PATENT DOCUMENTS

JP 63-297813 12/1988
JP 06-095723 4/1994
(Continued)

OTHER PUBLICATIONS

JP-2018179735-A_translated (Year: 2018).*
(Continued)

*Primary Examiner* — Catherine T. Rastovski
*Assistant Examiner* — Michael J Singletary
(74) *Attorney, Agent, or Firm* — MORI & WARD, LLP

(57) ABSTRACT

A machine tool includes an input interface configured to receive an instruction, an actuator configured to actuate, control circuitry configured to control an actuation of the actuator based on the instruction, a component having a physical state to be affected by the actuation, a sensor configured to detect the physical state, and a computer connected to the control circuitry via an external communication interface. The computer is configured to receive a signal from the sensor, generate, based on the signal, rough state-description data relevant to an occurrence of an abnormality in the component, transmit the rough state-description data to the control circuitry, generate detailed state-description data based on the signal, the detailed state-description data being more informative than the rough state-description data such that the detailed state-description data facilitates identifying an abnormal part in the component, and transmit the detailed state-description data to a monitoring computer via a communication network.

15 Claims, 6 Drawing Sheets

(51) Int. Cl.
*G05B 19/406* (2006.01)
*G05B 19/414* (2006.01)
*G05B 23/02* (2006.01)

(52) U.S. Cl.
CPC ..... *G05B 19/4145* (2013.01); *G05B 23/0221* (2013.01); *G05B 2223/06* (2018.08)

(58) Field of Classification Search
CPC ...... G05B 2223/06; G05B 2219/33299; G05B 2219/34465; G05B 2219/34477; G05B 19/4063
See application file for complete search history.

(56) References Cited

U.S. PATENT DOCUMENTS

| | | | | |
|---|---|---|---|---|
| 2020/0309642 | A1* | 10/2020 | Teshima | G06Q 50/04 |
| 2021/0086267 | A1* | 3/2021 | Hayashi | B23Q 15/12 |

FOREIGN PATENT DOCUMENTS

| | | | |
|---|---|---|---|
| JP | 10-222220 | | 8/1998 |
| JP | 20015-022108 | | 1/2003 |
| JP | 2004-192326 | | 7/2004 |
| JP | 2004-265009 | | 9/2004 |
| JP | 2004265009 | A * | 9/2004 |
| JP | 2004-302675 | | 10/2004 |
| JP | 2006-234784 | | 9/2006 |
| JP | 2016-33705 | | 3/2016 |
| JP | 2017-032520 | | 2/2017 |
| JP | 2017-219469 | | 12/2017 |
| JP | 2018-155675 | | 10/2018 |
| JP | 2018-179735 | | 11/2018 |
| JP | 2018179735 | A * | 11/2018 |
| JP | 20153-135467 | | 8/2019 |
| JP | 2020-041849 | | 3/2020 |
| JP | 6805314 | B1 | 12/2020 |

OTHER PUBLICATIONS

JP-2004265009-A_translated (Year: 2004).*
Supplementary European Search Report for corresponding EP Application No. 21934968.5-1216, Feb. 16, 2024.
European Office Action for corresponding EP Application No. 21934968.5-1216, Feb. 28, 2024.
Chinese Office Action for corresponding CN Application No. 202180093899.4, Nov. 10, 2025 (w/machine translation).
International Search Report for corresponding International Application No. PCT/JP2021/014008, Jun. 29, 2021.
Japanese Office Action for corresponding JP Application No. 2021-554372, Jan. 6, 2022, (w/ English machine translation).
Japanese Office Action for corresponding Application No. 2021-554372, Apr. 19, 2022, (w/ English machine translation).
Japanese Office Action for corresponding Application No. 2021-554372, Jun. 27, 2022, (w/ English machine translation).
The International Preliminary Report on Patentability (Chapter I) with translation of Written Opinion for corresponding International Application No. PCT/JP2021/014008, Oct. 3, 2023.
Chinese Office Action for corresponding CN Application No. 202180093899.4, Mar. 19, 2026 (w/machine translation).
Qian et al., Electrical Control and Maintenance of Industrial Robots, Textbook for the Industrial Robot Technology Specialty by the National Mechanical Vocational Education Teaching Steering Committee, Huazhong University of Science and Technology Press, Feb. 28, 2017 (w/machine translation).
Chen et al., Fault Diagnosis and Maintenance of CNC Machine Tools, 21st Century National Higher Education Application-Oriented Quality Course Planned Textbook, Beijing Institute of Technology Press, Feb. 28, 2010 (w/machine translation).

* cited by examiner

FIG. 4

```
Function RoughDiagnosis(n0);
{
// Declare constants
const var th1 = <TH1 value>;
const var th2 = <TH2 value, but TH2>Th1>;

// Declare variables
var fa = <fA /N0 value> * n0;
var fb = <fB /N0 value> * n0;
var fc = <fC /N0 value > * n0;
var data = [];
var envelopedata = [];
var fftdata = [];
var sum, rsmvalue,
var level;

Data = getData (5.0);                          // Obtain sensor signal for 5 seconds
Envelopedata = getEnvelope (data);             // Envelope conversion
Fftdata= getFFT (envelopedata);                // Multiply envelopdata[] value by fft
Sum = getFrequencyData (fftdata, fa) + getFrequencyData (fftdata, fb) +
getFrequencyData (fftdata, fc);                // Sum frequency components of FA, FB, and FC
Rsmvalue = getRMSvalue (fftdata, 0, MAX);  //Obtain root mean square value of all frequency components
If (sum < th1)
  level = < Determination value indicating no problem>;
else if (sum < th2)
  level = < Determination value indicating caution>;
else
  level = <Determination value indicating warning >;

 sendData ('level=' + level + ';rsm=' + rsmvalue);

return;
}
```

MACHINE TOOL, DIAGNOSIS SYSTEM FOR MACHINE TOOL, AND METHOD OF DIAGNOSING MACHINE TOOL

CROSS-REFERENCE TO RELATED APPLICATIONS

The present application is a continuation application of International Application No. PCT/JP2021/014008, filed Mar. 31, 2021. The contents of this application are incorporated herein by reference in their entirety.

BACKGROUND OF THE INVENTION

Field of the Invention

The present invention relates to a machine tool, a diagnosis system for a machine tool, and a method of diagnosing a machine tool.

Discussion of the Background

Systems to detect abnormalities of machine tools using external remote monitor apparatuses have become widely used (for example, JP 2004-265009 A). In JP 2004-265009 A, a machine tool itself performs a rough diagnosis on a failure in the machine tool. If an abnormality is identified as a result of the rough diagnosis, detailed diagnosis means at a remote location performs a detailed diagnosis on the abnormality. On the other hand, such systems have been conventionally known that an abnormality diagnosis device mounted on a machine tool diagnoses an abnormality in the machine tool (for example, JP 2006-234784 A). In JP 2006-234784 A, a vibration sensor is mounted on a bearing of the machine tool, and a particular frequency component value is detected from a signal from the vibration sensor. Then, based on the component value, a damage to the bearing is determined.

SUMMARY OF THE INVENTION

According to one aspect of the present invention, a machine tool includes an input interface, an actuator, control circuitry, a component, a sensor, a computer, and an output interface. The input interface is configured to receive an instruction. The actuator is configured to actuate based on the instruction. The control circuitry is configured to control an actuation of the actuator based on the instruction. The component has a physical state to be affected by an actuation of the actuator. The sensor is configured to detect the physical state of the component. The computer is connected to the control circuitry via an external communication interface. The computer is configured to receive a signal from the sensor, generate, based on the signal, rough state-description data relevant to an occurrence of an abnormality in the component, transmit the rough state-description data to the control circuitry, generate detailed state-description data based on the signal, the detailed state-description data being more informative than the rough state-description data such that the detailed state-description data facilitates identifying an abnormal part in the component, and transmit the detailed state-description data to a monitoring computer via a communication network. The monitoring computer is configured to analyze the physical state of the component. The output interface is configured to notify an operator of whether the abnormality is occurring in the component based on the rough state-description data transmitted to the control circuitry.

According to another aspect of the present invention, a diagnosis system for a machine tool includes the machine tool according to the first aspect, wherein the monitoring computer is configured to transmit a second command to the computer to control the computer to generate the detailed state-description data based on the signal, and wherein the computer is configured to generate the detailed state-description data upon receipt of the second command and to transmit to the monitoring computer, the generated detailed state-description data that is generated. The diagnostic system further includes the monitoring computer, the communication network connecting the monitoring computer and the computer to each other, and a gateway provided between the monitoring computer and the computer on the communication network.

According to the other aspect of the present invention, a method of diagnosing a machine tool includes receiving an input to cause control circuitry of the machine tool to drive an actuator of the machine tool based on the input to change a physical state of a component of the machine tool. The method includes detecting the physical state of the component. The method includes transmitting a signal indicating the physical state detected to a computer of the machine tool to allow the computer to generate rough state-description data and detailed state-description data based on the signal, the rough state-description data being relevant to an occurrence of an abnormality in the component, the detailed state-description data being more informative than the rough state-description data such that the detailed state-description data facilitates identifying an abnormal part in the component. The method includes transmitting the rough state-description data from the computer to the control circuitry via an external communication interface. The method includes transmitting the detailed state-description data from the computer to a monitoring computer via a communication network, the monitoring computer being configured to analyze the physical state of the component. The method includes notifying an operator of whether the abnormality is occurring in the component based on the rough state-description data transmitted to the control circuitry.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 4 illustrates an application example of a rough diagnosis script;

DESCRIPTION OF THE EMBODIMENTS

Figure 1:
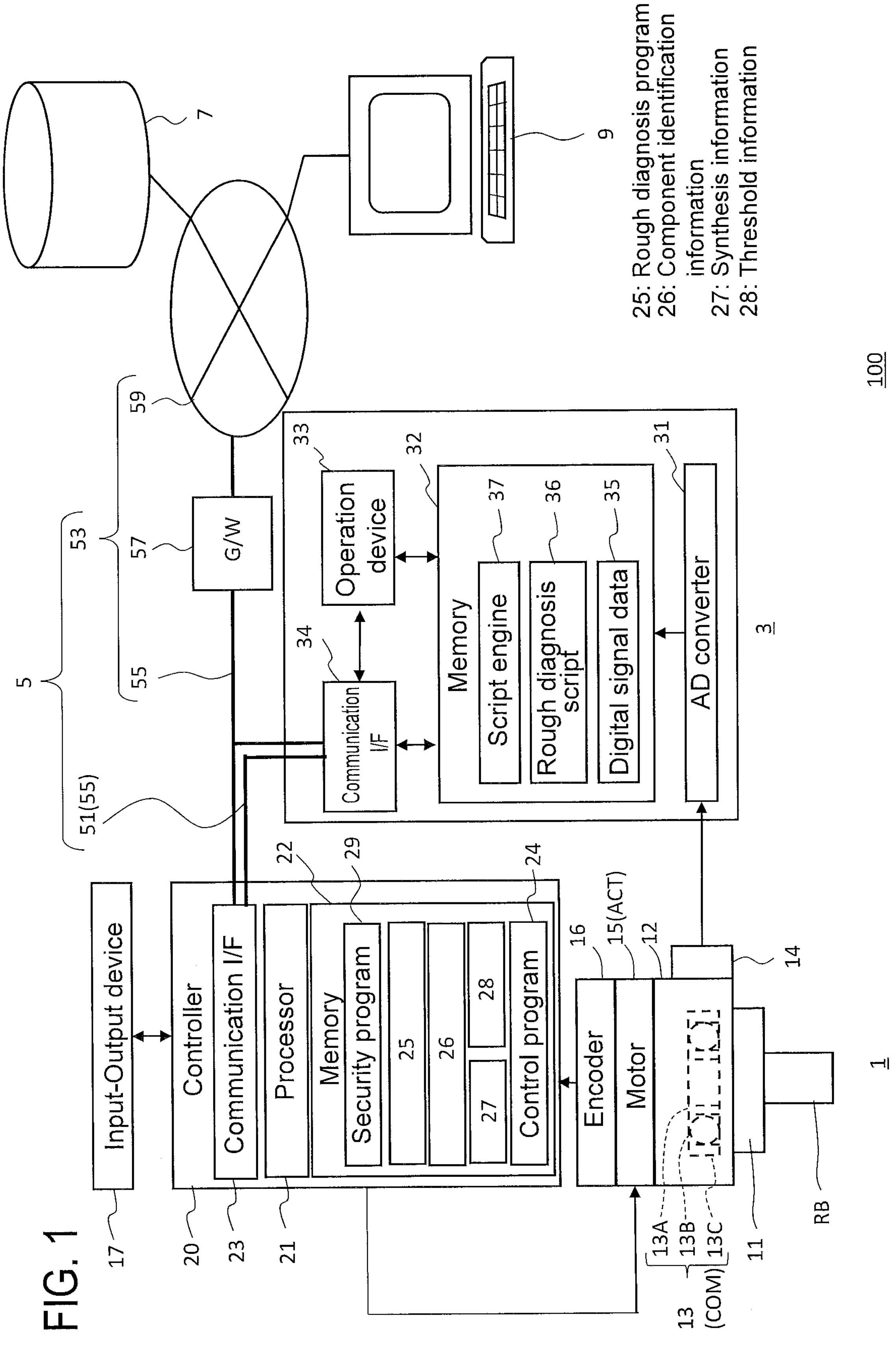
FIG. 1 is a block diagram illustrating a configuration of a diagnosis system according to an embodiment for a machine tool.

The embodiments will now be described with reference to the accompanying drawings, wherein like reference numerals designate corresponding or identical elements throughout the various drawings.

EMBODIMENT

Configuration of Machine Tool 1

FIG. 1 is a block diagram illustrating a configuration of a diagnosis system 100 according to an embodiment of the present invention. The diagnosis system 100 is for a machine tool. The diagnosis system 100 includes a machine tool 1, a signal processing device (a computer) 3, a network 5, a storage 7, and a remote monitor apparatus (a monitoring computer) 9. The machine tool 1 includes a spindle 11, a spindle case 12, a bearing 13, a sensor 14, a motor 15, an encoder 16, an Input-Output device 17, and a controller 20. The spindle 11 is mounted on the spindle case 12 via the bearing 13 and rotatable relative to the spindle case 12. More specifically, the bearing 13 includes an inner ring 13A, a rolling element 13B, and an outer ring 13C. The spindle 11 is connected to the inner ring 13A. The inner ring 13A is rotationally movable together with the spindle 11. the rolling element 13B is configured to rotationally move on the inner surface of the outer ring 13C in accordance with the rotation of the inner ring 13A. While the outer ring 13C is fixed to the spindle case 12, the outer ring 13C vibrates when the rolling element 13B moves. To the spindle 11, a machining-purpose rotation body RB is attachable. The rotation body RB may be a tool or a workpiece. The sensor 14 is mounted on the bearing 13 or a part near the bearing 13. The sensor 14 is configured to detect a vibration of the bearing 13 which vibration is involved with a rotation of the spindle 11. That is, the sensor 14 is a vibration sensor configured to detect a vibration of the bearing 13. It is to be noted that other sensors than the sensor 14 may be mounted on parts near detection targets other than the bearing 13. That is, a plurality of sensors may be provided.

The motor 15 is an actuator ACT of the machine tool 1, and rotates the spindle 11. When the spindle 11 is rotated in this manner, the inner ring 13A and the rolling element 13B of the bearing 13 are rotated, causing the inner ring 13A, the rolling element 13B, and the outer ring 13C of the bearing 13 to vibrate. Thus, the machine tool 1 includes parts that are variable in state based on an operation of the actuator ACT. In this embodiment, these parts will be referred to as components COM. Accordingly, the bearing 13 may be referred to as a component COM. It is to be noted that the bearing 13 is an example component COM and that another part variable in state based on an operation of another actuator ACT of the machine tool 1 may be regarded as a component COM. As used herein, the term "state" is intended to mean a state of a physical phenomenon such as vibration, sound, temperature, light, capacitance, oil film thickness, and emission of chemical component species such as smoke. Accordingly, "state" can be referred to as "physical state". The sensor 14 may be a sensor to detect such state of the component COM. In a case where the bearing 13 is a component COM, the component COM includes a plurality of parts.

At the motor 15, the encoder 16 is provided to measure a rotation speed of the motor 15 and input the measured rotation speed to the controller 20. It is to be noted that there may be a case in which an other rotation speed detector is capable of detecting the rotation speed of the motor 15. In this case, the encoder 16 may be replaced with the other rotation speed detector. The controller 20 is configured to control an operation of the actuator ACT. Specifically, based on the rotation speed of the motor 15 measured by the encoder 16, the controller 20 controls the current supplied to the motor 15 to maintain the instructed rotation speed input to the controller 20. The Input-Output device 17 includes an input interface and an output interface. On the input interface, the instructed rotation speed is input. The output interface indicates the present rotation speed of the motor 15 measured by the encoder 16. That is, the Input-Output device 17 is configured to receive an instruction for the controller 20 to cause the actuator ACT to make an operation, and configured to notify an operation status of the actuator ACT.

The Input-Output device 17 is a control panel commonly used as an Input-Output device of the machine tool 1. Examples of such Input-Output device 17 include a touch panel integral to an Input-Output interface, and a control panel including switches, push buttons, and a monitor. Examples of the input interface (a user interface) include a touch sensor, switches, push buttons, and a monitor. Examples of the output interface (an indicator) include a display in the touch panel, the monitors, or speakers attached to the touch panel or the monitor. It is to be noted that the input interface and the output interface may not necessarily be provided on the same panel of the Input-Output device 17; the input interface and the output interface may be separate from each other to a degree that enables an operator to make inputs to the input interface while checking the present rotation speed of the motor 15 on the output interface.

The controller (control circuitry) 20 includes a processor 21, a memory 22, and a communication interface 23. The controller 20 at least includes a computer numerical controller (computerized numerical control device) and a programmable logic controller (programmable logic controller). The processor 21 executes a program stored in the memory 22 to control various operations of the machine tool 1. The memory 22 at least includes a nonvolatile memory that stores the program and various parameters used by the program. The memory 22 is configured to store a control program 24, a rough diagnosis program 25, a factor identification information 26, a synthesis information 27, a threshold information 28, and a security program 29. The control program 24 is a program for performing feedback control of controlling the motor 15 to rotate at an instructed rotation speed input via the Input-Output device 17. Specifically, based on a signal from the encoder 16, the control program 24 performs processing of controlling the current supplied to the motor 15 to make the rotation speed of the motor 15 close to the instructed rotation speed.

The rough diagnosis program 25 is a program that is used in a rough diagnosis of an abnormality in the bearing 13 and that is for receiving an operation of the motor 15 and a rough diagnosis result from the signal processing device 3. The rough diagnosis result is generated by executing a rough diagnosis script 36, which is installed in advance in the signal processing device 3. The rough diagnosis script 36 is generated in advance in the controller 20 based on the factor identification information 26, the synthesis information 27, and the threshold information 28, and is transmitted to the signal processing device 3. It is possible, however, for the rough diagnosis program 25 to generate the rough diagnosis script 36 and transmit the rough diagnosis script 36 to the signal processing device 3 to receive the rough diagnosis result. The rough diagnosis script 36 is a program code for generating, based on a signal from the sensor 14, concise state-description data using at least one of the factor identification information 26, the synthesis information 27, and the threshold information 28. The rough state-description data is relevant to an occurrence of an abnormality in the component COM. The factor identification information 26, the synthesis information 27, and the threshold information 28 are intended to mean parameters used in the rough diagnosis script 36. The controller 20 performs processing of generating a first command and transmitting the generated first command to the signal processing device 3. The first command includes an execution command for executing the rough diagnosis script 36. That is, the first command includes at least one of: a program code for generating rough state-description data based on a signal from the sensor 14; and an execution command for executing a program code transmitted to the signal processing device 3 from the controller 20 and stored in the signal processing device 3. After the rough diagnosis script 36 is executed, the rough state-description data generated in the signal processing device 3 is transmitted to the controller 20. Based on the rough state-description data received by the controller 20, the rough diagnosis program 25 performs processing of, via the Input-Output device 17, notifying the operator of whether an abnormality is occurring in the component COM. Thus, the controller 20 is configured to transmit the first command to the signal processing device 3. The first command instructs rough state-description data to be generated based on a signal from the sensor 14. Also based on the rough state-description data transmitted to the controller 20, the Input-Output device 17 is configured to notify the operator of whether an abnormality is occurring in the component COM. The security program 29 performs processing of controlling the remote monitor apparatus 9 to access the signal processing device 3. Processing details of the rough diagnosis program 25 and the security program 29 will be described later.

The signal processing device 3 is configured to process the signal from the sensor 14. In a case where a plurality of sensors 14 are provided, the signal processing device 3 may be configured to process, in parallel, signals from the sensors. The signal processing device 3 includes an analogue digital converter (AD converter) 31, a memory 32, an operation device 33, and a communication interface 34. The AD converter 31 is configured to convert an analogue signal from the sensor 14 into a digital signal. The memory 32 is configured to store information such as digital signal data 35 and the above-described rough diagnosis script 36. The digital signal data 35 is a digital signal obtained by converting the signal from the sensor 14; The memory 32 is also configured to store a script engine 37 and digital signal components extracted by the operation device 33. The script engine 37 executes scripts such as the rough diagnosis script 36. The communication interface 34 controls communication between the communication interface 23 of the controller 20 and the signal processing device 3 and communication between the remote monitor apparatus 9 and the signal processing device 3.

Specifically, upon receipt of the first command from the controller 20, the communication interface 34 transmits information based on the first command to the operation device 33, and the operation device 33 executes the script engine 37 to perform processing described in the rough diagnosis script 36. Accordingly, the operation device 33 includes a processor and a memory like a computer. By performing this processing, the operation device 33 generates rough state-description data based on the digital signal originating from the sensor 14, and transmits the generated rough state-description data to the communication interface 34. The communication interface 34 transmits the rough state-description data to the controller 20 as a reply to the first command.

Thus, the signal processing device 3 is configured to generate rough state-description data based on a signal from the sensor 14, the rough state-description data being relevant to an occurrence of an abnormality in the component COM, and configured to transmit the generated rough state-description data to the controller 20. The first command and the rough state-description data will be detailed later. It is to be noted that the operation device 33 may include an application specific integrated circuit (ASIC), which is capable of fast digital signal processing such as fast Fourier transformation (FFT), or that the operation device 33 may be implemented by a typical processor and a program for performing digital signal processing. The communication interface 34 and the communication interface 23 of the controller 20 may be implemented by a communication interface, such as an Ethernet and a serial-parallel line, and software for controlling the communication interface, or may be implemented by dedicated hardware.

The network 5 includes a communication line 51 and a communication network 53. The communication line 51 connects the controller 20 and the signal processing device 3 to each other. Specifically, the communication line 51 connects the communication interface 23 of the controller 20 to the communication interface 34 of the signal processing device 3. The first command and the rough state-description data are transmitted via the communication line 51. While the communication line 51 is preferably an Ethernet, the communication line 51 may be a serial line such as RS-232C and USB or a parallel line such as SCSI. Further, the communication line 51 may not necessarily be implemented by wired communication line but may be implemented by wireless communication. Communication capacity of the communication line 51 may be smaller than communication capacity of the communication network 53. RS-232C, USB, SCSI, wireless communication interface, and wired communication interface are examples of external communication interface.

The communication network 53 connects the signal processing device 3 and the remote monitor apparatus 9 to each other. The communication network 53 includes an Ethernet 55 and an Internet 59. The Ethernet 55 is a network in the factory, plant, or other facility where the machine tool 1 is provided. The communication line 51 may be an Ethernet identical to the Ethernet 55. In a case where the communication line 51 is a communication line different from the Ethernet 55, the communication interface 23 of the controller 20 may preferably be connected to the Ethernet 55 as well. A gateway 57 is provided between the Ethernet 55 and the Internet 59. That is, the gateway 57 is provided between the signal processing device 3 and the remote monitor apparatus 9. The gateway 57 is configured to, based on a access control list (ACL), permit only the remote monitor apparatus 9 and those terminals determined in advance to access the Ethernet 55.

The remote monitor apparatus 9 is configured to analyze a state of the component COM. In order to perform this analysis, the remote monitor apparatus 9 is configured to transmit a second command to the signal processing device 3. The second command instructs detailed state-description data to be generated based on a signal from the sensor 14. As used herein, the term "detailed state-description data" is intended to mean data that is for identifying the position of an abnormality in the component COM and that is more informative than the rough state-description data. Upon receipt of the second command, the signal processing device 3 is configured to generate detailed state-description data and transmit the generated detailed state-description data to the remote monitor apparatus 9. The second command and the detailed state-description data are transmitted via the communication network 53. The second command and the detailed state-description data will be detailed later.

The storage 7 is a storage device provided on the Internet 59. The storage 7 is preferably a storage in a cloud system provided on the Internet 59, and both the controller 20 and the remote monitor apparatus 9 have access to the storage 7. Specifically, the remote monitor apparatus 9 has access to the storage 7 via the communication network 53, and the controller 20 has access to the storage 7 via the communication network 53. It is to be noted, however, that the storage 7 may be provided on the site of the workplace where the remote monitor apparatus 9 is provided and that the storage 7 may be accessible from the remote monitor apparatus 9 via an Ethernet. The controller 20 is configured to transmit, to the storage 7, the rough state-description data transmitted from the signal processing device 3. Specifically, upon receipt of the rough state-description data from the signal processing device 3, the controller 20 is configured to transmit the received rough state-description data to the storage 7. The storage 7 is configured to receive the rough state-description data from the controller 20 and store the received rough state-description data. Specifically, the storage 7 is configured to store sets of the rough state-description data for each of the components COM such that the sets of the rough state-description data are searchable on a time-series basis. In a case where a plurality of sensors are provided, the storage 7 may be configured to store sets of the rough state-description data such that the sets of the rough state-description data are searchable for each sensor connected to each component COM, instead of being searchable for each component COM. Insofar as the sets of the rough state-description data are searchable on a time-series basis, the sets of the rough state-description data may be stored in the storage 7 in an order different from the time-series order, such as decreasing order of the numerical values included in the data. When the remote monitor apparatus 9 analyzes the detailed state-description data, the remote monitor apparatus 9 configured to obtain the rough state-description data from the storage 7.

Rough Diagnosis Method

Next, description will be made with regard to a rough diagnosis method according to this embodiment which method is performed for a component COM by the rough diagnosis program 25. In order for the rough diagnosis script 36 to be executed after being called from the rough diagnosis program 25, it is necessary to set the factor identification information 26, the synthesis information 27, and the threshold information 28 in advance. A method of this setting will be described. As used herein, the term "factor identification information 26" is intended to mean information for identifying a plurality of factors of the signal from the sensor 14 which are relevant to an abnormality in a component COM. In the following description, the bearing 13 will be taken as an example component COM in a case where each of the inner ring 13A, the rolling element 13B, and the outer ring 13C of the bearing 13 is damaged. In this case, a vibration is known to occur at a particular frequency corresponding to each of the inner ring 13A, the rolling element 13B, and the outer ring 13C (see, for example, JP 63-297813 A).

In the following description, the rotation speed of the motor 15 will be denoted No ($\text{min}^{-1}$), the diameter of the rolling element 13B of the bearing 13 will be denoted d (mm), the pitch circle diameter of the rolling element 13B will be denoted d (mm), the number of rolling elements 13B will be denoted Z, and the contact angle of the rolling element 13B will be denoted α (radian). In this respect, frequency $f_A$ (Hz) is a frequency at which a vibration occurs when the inner ring 13A has a damage or a separation at the race face of the inner ring 13A, frequency $f_B$ (Hz) is a frequency at which a vibration occurs when the rolling element 13B has a damage or a separation, and frequency $f_C$ (Hz) is a frequency at which a vibration occurs when the outer ring 13C has a damage or a separation at the race face of the outer ring 13C. The frequency $f_A$, the frequency $f_B$, and the frequency $f_C$ are respectively represented by the following Formulae (1) to (3).

$$f_A=(Z\text{No}/120)\cdot(1+d\cdot\cos\alpha/D) \tag{1}$$

$$f_B=(\text{No}D/120d)\cdot\{1-(d/D)^2\cdot\cos^2\alpha\} \tag{2}$$

$$f_C=(Z\text{No}/120)\cdot(1-d\cdot\cos\alpha/D) \tag{3}$$

Among the above-described parameters, the diameter of the rolling element 13B, the pitch circle diameter of the rolling element 13B, the number of rolling elements 13B, and the contact angle of the rolling element 13B are determined based on the specifications of the bearing 13. Also, the rotation speed of the motor 15 can be set to an optimal value empirically. The factor identification information 26 includes information for identifying a first frequency $f_A$, a second frequency $f_C$, and a third frequency $f_B$, which are respectively determined in the above-described manners. That is, the plurality of factors relevant to abnormality in the component COM include frequency components of a first frequency $f_A$, a second frequency $f_C$, and a third frequency $f_B$. The frequency component of the first frequency $f_A$ is a factor of a signal from a vibration sensor (the sensor 14) susceptible to a damage to the inner ring 13A. The frequency component of the second frequency $f_C$ is a factor of a signal from a vibration sensor (the sensor 14) susceptible to a damage to the outer ring 13C. The frequency component of the third frequency $f_B$ is a factor of a signal from a vibration sensor (the sensor 14) susceptible to a damage to the rolling element 13B. In other words, the plurality of factors each represent each of a plurality of abnormalities including a damage to a plurality of parts of the component COM and an abnormal engagement between the plurality of parts. The factor identification information 26 may also include information indicating all frequency components as a parameter for identifying how the bearing 13 is damaged as a whole. It is to be noted that the factor identification information 26 includes, more specifically, $f_A$/No, $f_B$/No, and $f_C$/No for the ease with which a change in No, which is the rotation speed of the motor 15, is dealt with. It is also to be noted that in the following description, the rotation speed of the motor 15 determined empirically for rough diagnosis purposes will be referred to as rough diagnosis rotation speed. The rough diagnosis program 25 is capable of perform processing of, by calling the control program 24, causing the motor 15 to rotate at the rough diagnosis rotation speed.

The synthesis information 27 is information specifying a synthesis method of synthesizing at least two factors of the plurality of factors with each other. Using the synthesis information 27, a synthesis value is generated by combining a plurality of the frequency component values. Based on the synthesis value, an abnormality in the component COM is determined. In the synthesis value, the plurality of factors relevant to abnormality in the component COM are unidentifiably combined. Therefore, it is impossible to identify the position of the abnormality in the component COM by analyzing the synthesis value. For example, the synthesis information 27 stores information defining calculation of the sum or average of the frequency component of the frequency $f_A$, the frequency component of the frequency $f_B$, and the frequency component of the frequency $f_C$. The synthesis information 27 also stores information defining calculation of an integration value of all the frequency components or a root mean square value (RMS value) of all the frequency components. The rough diagnosis rotation speed, the factor identification information 26, and the synthesis information 27 are stored in the memory 22 when the rough diagnosis script 36 is generated in the controller 20. It is to be noted, however, that the rough diagnosis rotation speed, the factor identification information 26, and the synthesis information 27 may be changed in value based on an input via the Input-Output device 17.

The threshold information 28 includes a threshold for determining an abnormality in the component COM. Specifically, the threshold information 28 is information for determining whether the synthesis value, which has been obtained by a synthesis based on the synthesis information 27, is abnormal (examples of the synthesis value including: the sum of the frequency component of the frequency $f_A$, the frequency component of the frequency component $f_B$, the frequency component of the frequency $f_C$; and an integration value of all the frequency components). The threshold included in the threshold information 28 may not necessarily be one threshold; the threshold information 28 may include thresholds corresponding to a plurality of state stages. Examples include a threshold for determining an abnormal state (this state will be hereinafter referred to as "warning"), and a threshold indicating a state that is not as serious as the abnormal state but requires caution (this state will be hereinafter referred to as "caution"). The threshold information 28 is stored in the memory 22 when the rough diagnosis script 36 is generated in the controller 20. It is to be noted, however, that the threshold information 28 may be changed in value based on an input via the Input-Output device 17.

Figure 2:
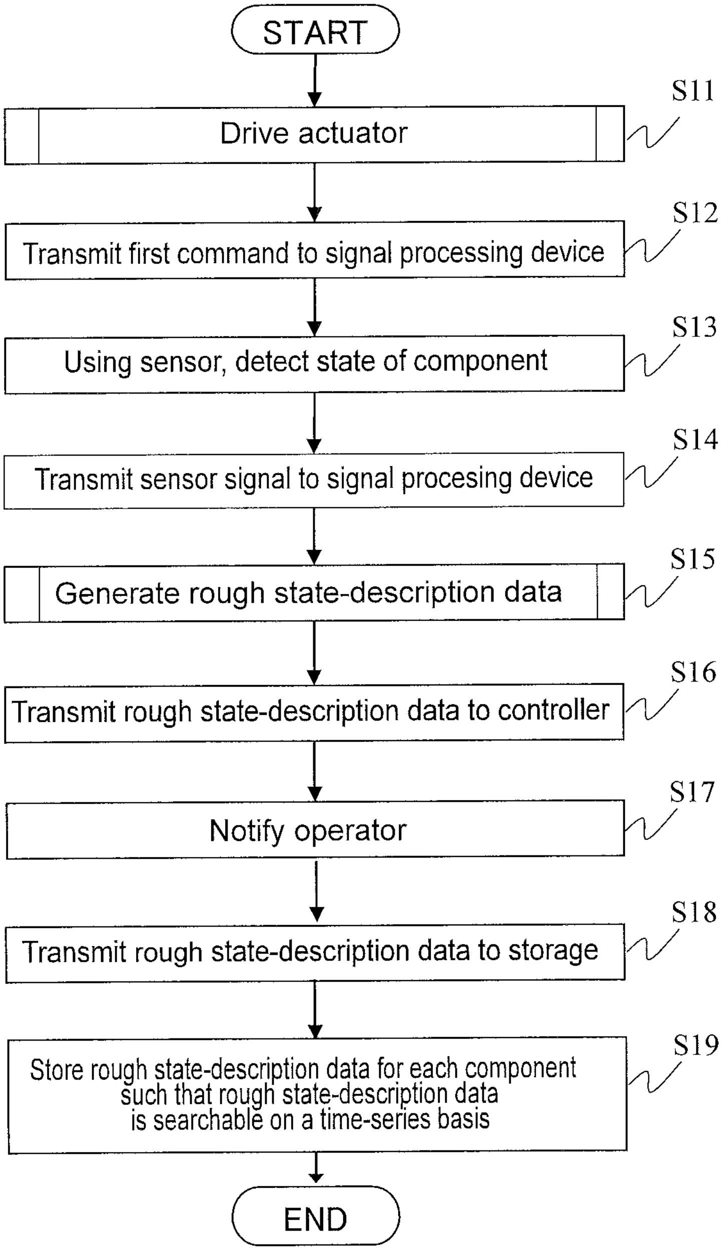
FIG. 2 is a flowchart of rough diagnosis processing according to the embodiment.
Figure 3:
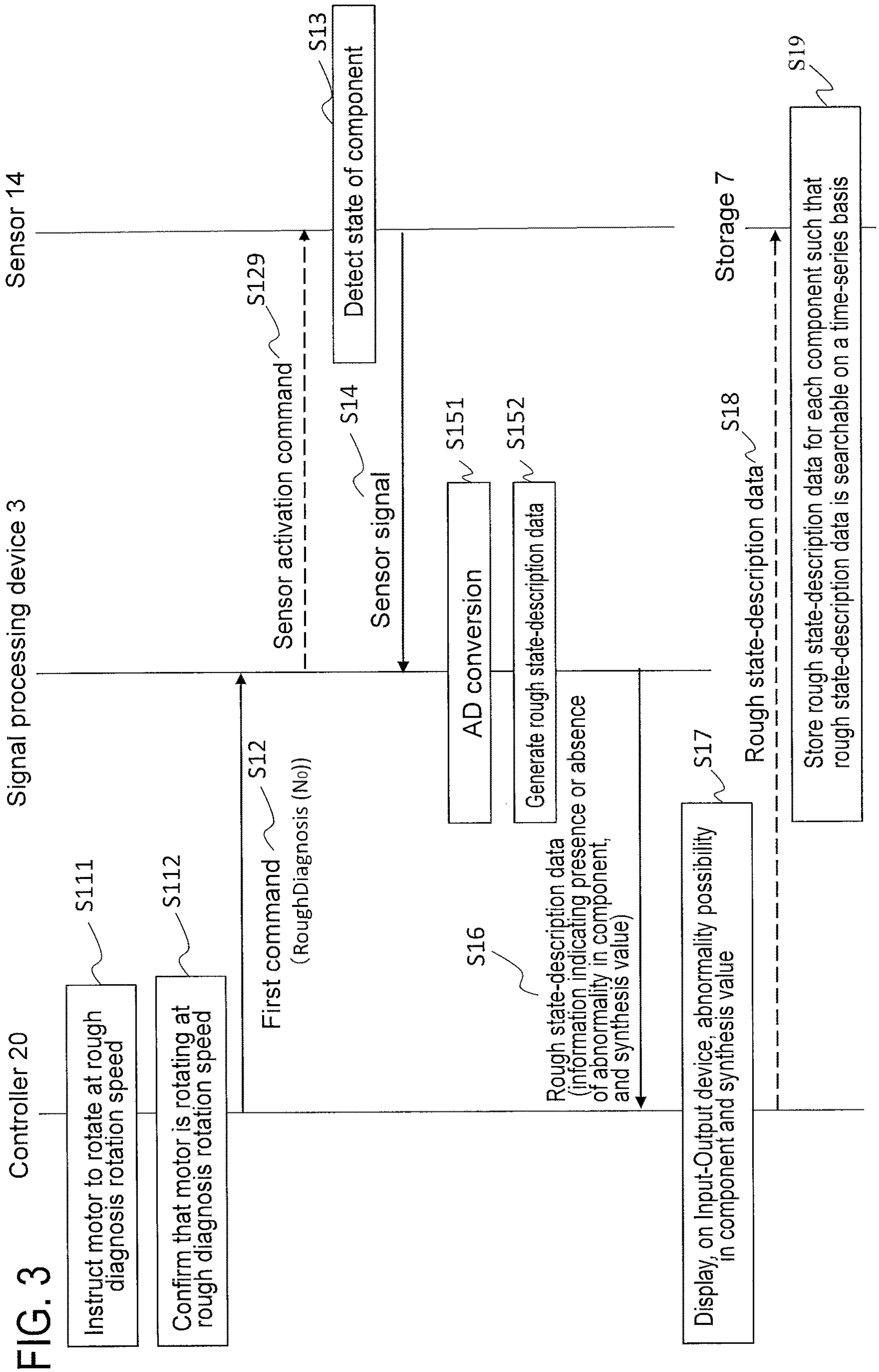
FIG. 3 is a sequence diagram of the rough diagnosis processing according to the embodiment.

The rough diagnosis program 25 is executed periodically. Specifically, the rough diagnosis program 25 is executed at the operation start time of the day. FIG. 2 is a flowchart of rough diagnosis processing performed by executing the rough diagnosis program 25. FIG. 3 is a sequence diagram of the rough diagnosis processing. Referring to FIGS. 2 and 3, at step S11, upon input on the Input-Output device 17 of the machine tool 1, the controller 20 drives the actuator ACT of the machine tool 1 to change the state of the component COM. Specifically, the operator activates the rough diagnosis program via the Input-Output device 17 at the operation start time of the day. The controller 20 calls the control program 24 from the rough diagnosis program 25, and transmits an instruction to the motor 15 to cause the motor 15 to rotate at the rough diagnosis rotation speed (step S111 in FIG. 3). It is to be noted that in a case where the rough diagnosis program 25 is automatically activated at the operation start time of the day, the "input" from the Input-Output device 17 of the machine tool 1 corresponds to an input to activate the machine tool 1.

By executing the control program 24, the controller 20 obtains the present rotation speed of the motor 15 from the encoder 16. The controller 20 monitors the present rotation speed of the motor 15 until the present rotation speed of the motor 15 becomes the rough diagnosis rotation speed. Then, upon confirming that the present rotation speed of the motor 15 is the rough diagnosis rotation speed (step S112), the controller 20 transmits the first command to the signal processing device 3 (step S12).

The first command is a command for instructing rough state-description data to be generated based on a signal from the sensor 14. The rough state-description data is relevant to an occurrence of an abnormality in the component COM. Specifically, the first command includes an execution command for executing the rough diagnosis script 36, which describes details of processing of generating rough state-description data based on a signal from the sensor 14, the rough state-description data being relevant to an occurrence of an abnormality in the component COM. The rough diagnosis script 36 preferably includes the factor identification information 26, the synthesis information 27, and the threshold included in the threshold information 28. The rough diagnosis script 36 describes, in a script language, a method of generating the rough state-description data. For example, it is possible to describe a script as illustrated in FIG. 4. The script demands the following processings. (i) Obtain a signal from the sensor 14 for 5 seconds, and subject the signal to AD conversion, envelope processing, and FFT to extract the frequency components of the particular frequencies $f_A$, $f_B$, and $f_C$. (ii) Obtain the sum of the frequency components. (iii) When the sum is in excess of a threshold of TH1, set the caution value included in the rough state-description data to TRUE. (iv) When the sum is in excess of a threshold of TH2 (TH1<TH2), set the warning value included in the rough state-description data to TRUE. (v) Obtain the root mean square value of all the frequency components. (vi) Return the caution value, the warning value, and the execution value.

FIG. 4 illustrates an example of the rough diagnosis script 36 using JavaScript, which is a representative script language. The example illustrated in FIG. 4 is provided for exemplary purposes only, and it is possible to use any other script language or a markup language such as XML. As illustrated in FIG. 4, RoughDiagnosis function is capable of receiving argument No (the rotation speed of the motor 15). Also in FIG. 4, the first two lines starting with "const var" declare constants necessary in the program. "th1, th2" are respectively substituted with the above-described TH1 and TH2 values read from the threshold information 28. For "fa", "fb", and "fc", the values of $f_A$/No, $f_B$/No, and $f_C$/No read from the factor identification information 26 are multiplied by the argument No, and resulting frequency values corresponding to $f_A$, $f_B$, and $f_C$ are respectively substituted in "fa", "fb", and "fc". "data" is an array in which values obtained by A/D converting outputs from the sensor 14 are stored. The elements of this array indicate, for example, sensor output values indicated on a time basis. "envelopdata" is an array in which values obtained by envelope-processing values in "data" are stored. The elements of this array indicate, for example, envelope values indicated on a time basis. "fftdata" is an array in which frequency spectra obtained by subjecting "envelopdata" to fast Fourier transformation are stored. The elements of this array indicate, for example, component values indicated on a frequency basis. In "sum", the sum of the $f_A$, $f_B$, and $f_C$ frequency components is stored. In "rsmvalue", the root mean square value of the frequency components is stored. In "level", determination values indicating no problem, caution, and warning are stored.

"getData" is a function that, during the time between function calling and description in the argument, causes the signal processing device 3 to A/D convert the signal from the sensor 14 to obtain a digital value, and outputs the digital value to variable "data". "data" is, physically, stored in the memory 32. It is to be noted that "getData" is an example function name, that any other function name may be used, and that the argument may be omitted. In a case where the argument is omitted, the signal processing device 3 obtains the signal from the sensor 14 for a time determined by default. Also, in a case where the signal processing device 3 includes a plurality of connection ports connectable to the sensor 14, a port number may be included as the argument for "getData".

"getEnvelope" is a function that subjects argument "data" to envelope processing to obtain envelope data and outputs the envelope data to the variable "envelopedata". Envelope processing is processing of taking an absolute value of an oscillatory wave form to detect an envelope curve. "envelopedata" is, physically, stored in the memory 32. It is to be noted that "getEnvelope" is an example function name and that any other function name may be used. "getFFT" is a function that subjects the argument "envelopedata" to fast Fourier transformation to obtain a frequency spectrum and outputs the frequency spectrum to the variable "fftdata". "fftdata" is, physically, stored in the memory 32. It is to be noted that "getFFT" is an example function name and that any other function name may be used. Also, in a case where a frequency component limited to a particular frequency range is output, it is possible to specify, as the argument for "getFFT", at least one of the minimal value and the maximum value of the frequency range.

"getFrequencyData(A,B)" outputs a frequency component corresponding to a frequency value that serves as an argument B from a frequency spectrum that serves as an argument A. For each of "fa", "fb", and "fc", "getFrequencyData" is called and the return values are added together so that the sum is substituted with the sum of the $f_A$, $f_B$, $f_C$ frequency components. It is to be noted that "getFrequencyData" is an example function name and that any other function name may be used. It is also to be noted that the order of the arguments may be reversed and/or the argument data form may be any other form. For example, the argument B may specify the order of certain data in the array fftdata[ ]. For another example, in a case where a sampling frequency of fftdata[ ] is known, it is not necessary to use a function such as "getFrequencyData"; instead, it is possible to calculate which order of value in fftdata[ ] corresponds to each of frequency components corresponding to the $f_A$, $f_B$, and $f_C$ frequency values. Thus, it is possible to perform a calculation directly from fftdata[ ].

"getRMSvalue(A, B, C)" calculates, from the frequency spectrum that serves as the argument A, a root mean square value in a frequency range [B, C] specified by arguments B and C. In the example illustrated in FIG. 4, a root mean square value is calculated in the range from frequency 0 to MAX, which is the maximum frequency calculable by the signal processing device 3. It is to be noted that the maximum frequency MAX may be specified at any value that is twice or more than twice the frequency necessary to be detected. In "level", a determination value indicating caution is substituted when "sum" is equal to TH1 or less than TH2. In "level", a determination value indicating warning is substituted when "sum" is TH2 or more. "sendData" is a function that transmits, as rough state-description data, a character string described as an argument. The character string described between """ and """ includes: a character string for the controller 20 to identify the kind of subsequent data (for example, 'level='); and a delimiter ";". It is to be noted that the character string for identifying the kind of data may be omitted and that the delimiter may be another code.

The synthesis information 27 may be, for example, information that includes the codes of the script illustrated in FIG. 4 excluding the constant declaration. In this case, when the controller 20 executes the rough diagnosis program 25, the controller 20 may generate the first command by: reading the factor identification information 26, the synthesis information 27, and the threshold information 28; and adding a constant declaration to the codes stored as the synthesis information 27 based on the factor identification information 26, and the value stored in the threshold information 28. It is to be noted that the first command may be a binary code, instead of a script. In this case, the controller 20 may generate a binary code including details of the processing of the above-described script. The communication interface 34 of the signal processing device 3 may include a parser for analyzing the binary code of the first command. It is to be noted that in FIG. 4, the first command may use a function that outputs an integration value of all the frequency components, instead of using the function that outputs a rated value ("getRMSvalue(A, B, C)").

The first command is an execution command for executing the rough diagnosis script 36 represented by the above-described RoughDiagnosis. The first command also includes a rough diagnosis rotation speed as an argument of RoughDiagnosis. It is to be noted, however, that in a case where a rough diagnosis rotation speed is transmitted in advance to the signal processing device 3 as an argument of RoughDiagnosis, the first command may not necessarily include a rough diagnosis rotation speed. Upon receipt of the first command, the signal processing device 3 performs the processing described by the script engine 37 in the rough diagnosis script 36. Then, in accordance with the command described in "getData", the signal processing device 3 transmits a sensor activation command to the sensor 14 (step S129). Upon receipt of the sensor activation command, the sensor 14 detects a state of the component COM (step S13). The sensor 14 transmits, to the signal processing device 3, a signal (sensor signal) indicating the state detected by the sensor 14 (step S14). It is to be noted that step S129 may be omitted in a case where the sensor 14 continually outputs a sensor signal to the signal processing device 3, irrespective of the presence and absence of a sensor activation command. Upon receipt of the sensor signal, the signal processing device 3 generates, based on the signal, rough state-description data, which is relevant to an occurrence of an abnormality in the component COM (step S15). Specifically, the signal processing device 3 converts the sensor signal into a digital value (step S151).

Then, the signal processing device 3 generates rough state-description data based on the signal (step S152). Specifically, in accordance with commands defined by "getFFT" and "getFrequencyData" illustrated in FIG. 4, the signal processing device 3 extracts, from the signal, a plurality of factors relevant to an abnormality in the component COM. That is, the signal processing device 3 is configured to extract the plurality of factors from the signal. When the signal processing device 3 generates the rough state-description data, the signal processing device 3 calculates a synthesis value (sum), which is obtained by synthesizing at least two factors of the plurality of factors, based on the mathematical formula indicated by "sum= . . . " in FIG. 4 (synthesis method of synthesizing at least two factors of the plurality of factors with each other). That is, the signal processing device 3 is configured to calculate a synthesis value obtained by synthesizing at least two factors of the plurality of factors. Based on the logical formula "if (sum<th1) . . . else if (sum<th2) . . . else . . . " illustrated in FIG. 4, the signal processing device 3 determines (caution, warning) whether an abnormality is occurring in the components COM. That is, based on the above-described plurality of factors and threshold, the signal processing device 3 determines whether the abnormality is occurring in the components COM. Based on the above-described plurality of factors and threshold, the signal processing device 3 is configured to determine whether the abnormality is occurring in the components COM. Also, in accordance with an operation described by the argument of "sendData", the signal processing device 3 generates the rough state-description data based on the signal. This argument includes "sum", that is, the sum of the $f_A$, $f_B$, and $f_C$ frequency components. That is, the rough state-description data includes a synthesis value configured by at least two factors of the plurality of factors relevant to the abnormality in the component COM. The rough state-description data includes "level", that is, information indicating whether the abnormality is occurring in the component COM.

At step S16, the signal processing device 3 transmits the generated rough state-description data to the controller 20, which controls an operation of the actuator ACT. The controller 20 may store the received rough state-description data in relation to the time of receipt. Upon receipt of the rough state-description data from the signal processing device 3, the controller 20, at step S17, controls the Input-Output device 17 to display the synthesis value and information indicating whether the abnormality is occurring in the component COM. That is, based on the rough state-description data transmitted to the controller 20, the controller 20 notifies, via the Input-Output device 17, the operator of information indicating whether the abnormality is occurring in the component COM. In this notification, the controller 20 notifies the operator of the present rough state-description data. Additionally, using previous sets of rough state-description data, the controller 20 may control the Input-Output device 17 to display time-series changes in the degree of the abnormality in the component COM and time-series changes in the synthesis value.

At step S17, in a case where no abnormality (warning) is notified, the controller 20 permits the machining program to be executed. Then, the machine tool 1 is permitted to perform machining. The subsequent machining is performed by the operator's manipulation of the Input-Output device 17. For this reason, outputting the result of the rough diagnosis on the Input-Output device 17 is advantageous for smoothly performing the subsequent machining. At step S17, in a case where an abnormality (warning) is notified, the controller 20 notifies, via the Input-Output device 17, the abnormality and a measure that the operator should take. For example, a detailed diagnosis is recommended to the operator. It is to be noted that at step S18, the controller 20 performs an optional processing. Specifically, the controller 20 transmits the received rough state-description data to the storage 7, which is accessible by the remote monitor apparatus 9 via the communication network 53. At step S19, the storage 7 stores sets of the rough state-description data for each of the components COM such that the sets of the rough state-description data are searchable on a time-series basis. In a case where there is only one component COM for the machine tool 1, the storage 7 may manage the rough state-description data based on the address of the controller 20 transmitted such that sets of the rough state-description data are searchable for each of components COM. Another possible example is that the rough state-description data includes information on the components COM and that based on the information, the storage 7 may manage the rough state-description data for each of the components COM. Steps S18 and S19 are optional processings and may be omitted.

Detail Diagnosis Method

Next, description will be made with regard to a detailed diagnosis method for the components COM performed by the remote monitor apparatus 9 according to this embodiment. The detailed diagnosis is mainly performed in the following three cases (1) to (3).

(1) In a rough diagnosis, abnormality (warning) has been notified and a detailed diagnosis has been recommended to the operator as a measure.

(2) In a rough diagnosis, caution information has been notified and the operator has voluntarily chosen to perform a detailed diagnosis.

(3) An accident has occurred in the machine tool 1.

Figure 5:
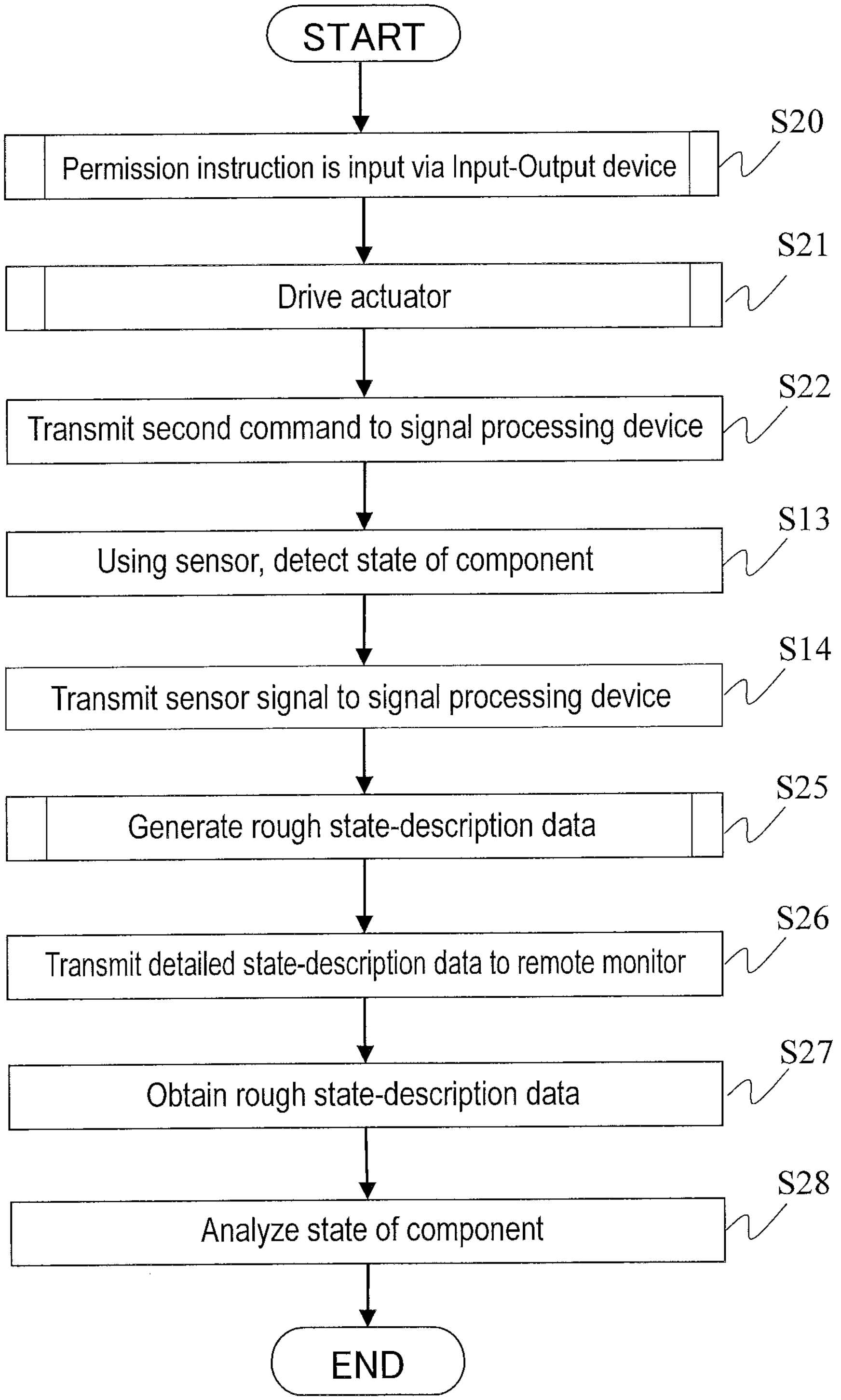
FIG. 5 is a flowchart of detailed diagnosis processing according to the embodiment.
Figure 6:
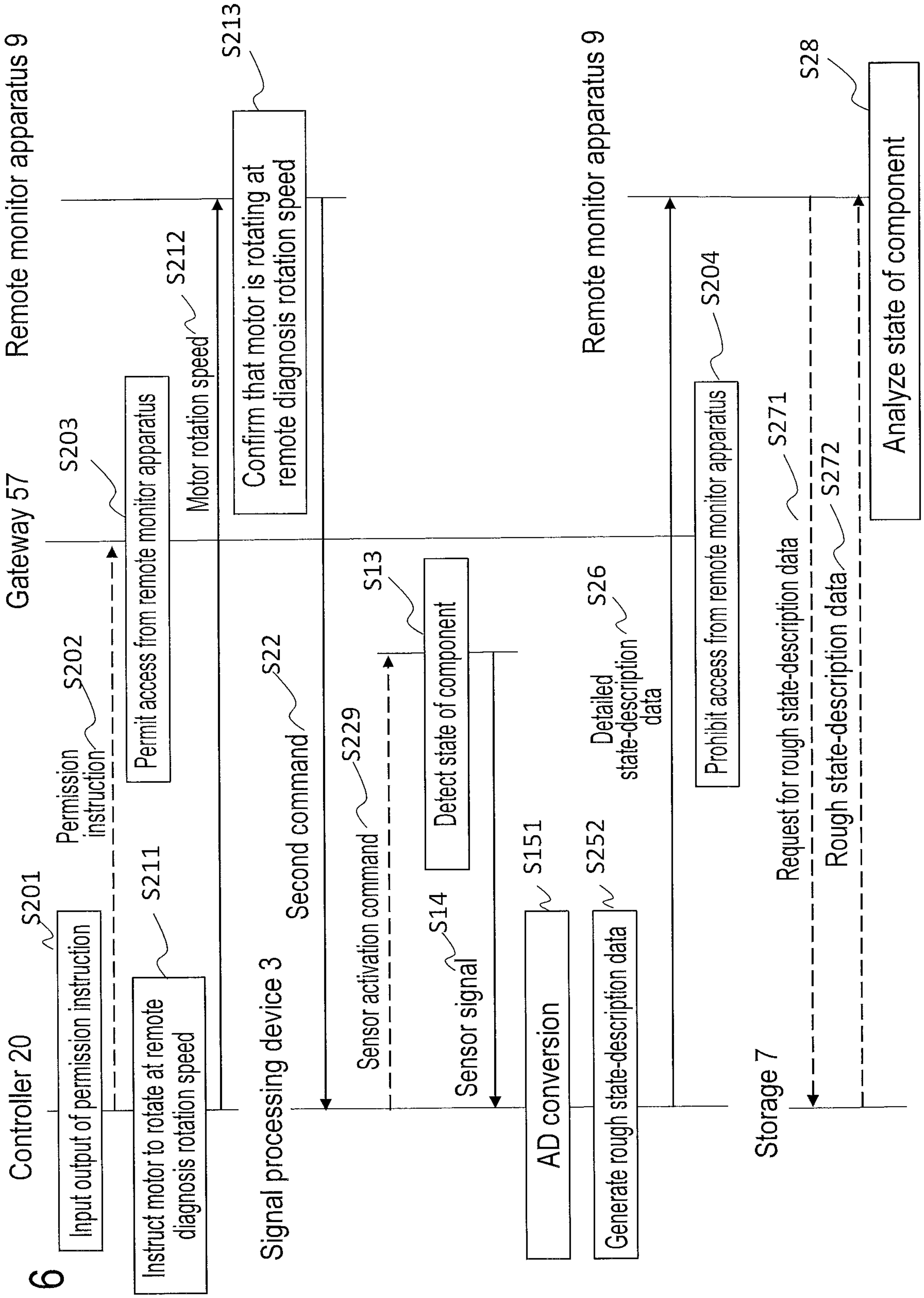
FIG. 6 is a sequence diagram of the detailed diagnosis processing according to the embodiment.

In the cases of (1) and (2), the operator facing the Input-Output device 17 after step S17 illustrated in FIG. 4 makes a phone call to or otherwise contacts a person in charge of operating the remote monitor apparatus 9. For this purpose, the result of the rough diagnosis is output on the Input-Output device 17. This is advantageous for smoothly taking a measure. In the case of (3), an accident is likely to occur during machining work with the operator facing the Input-Output device 17. In this case as well, the operator being aware of the accident makes a phone call to or otherwise contacts the person in charge of operating the remote monitor apparatus 9. After the contact, detailed diagnosis processing is performed, which is illustrated using a flowchart in FIG. 5. Also, a sequence diagram of the detailed diagnosis processing performed after the contact is illustrated in FIG. 6. In FIGS. 5 and 6, processings common to the rough diagnosis method and the detailed diagnosis method are designated with like reference numerals and will not be elaborated upon here.

First, at step S20, a permission instruction is input via the Input-Output device 17 to permit detailed state-description data to be output to the remote monitor apparatus 9. Usually, the gateway 57 is performing control of prohibiting access from the remote monitor apparatus 9. However, upon execution of the security program 29, the controller 20 inputs a permission instruction to the gateway 57. Upon input of the permission instruction, the gateway 57 permits access from the remote monitor apparatus 9 until one of the following events (1) to (4) occurs.

(1) The operator who is executing the security program 29 inputs, via the Input-Output device 17, a non-permission instruction to not permit the communication between the signal processing device 3 and the remote monitor apparatus 9, and the signal processing device 3 receives the non-permission instruction.

(2) The communication between the signal processing device 3 and the remote monitor apparatus 9 has timed out.

(3) The signal processing device 3 receives an end instruction to end the detailed diagnosis from the remote monitor apparatus 9.

(4) In a case where the signal processing device 3 only digitizes the signal from the sensor 14 using the AD converter 31 to obtain digital data and transmits the digital data to the remote monitor apparatus 9, the signal processing device 3 finishes transmitting all the digital data.

To describe step S20 more specifically, the operator activates the security program 29 via the Input-Output device 17 at step S201 of FIG. 6 to input the output of the permission instruction. At step S202, the security program 29 performs processing of transmitting the permission instruction to the gateway 57. That is, the controller 20 transmits the permission instruction to the gateway 57. After receiving the permission instruction, the gateway 57 permits access from the remote monitor apparatus 9 (step S203) until any one of the events (1) to (4) occurs (step S204).

At step S21, based on the input from the Input-Output device 17 of the machine tool 1, the controller 20 drives the actuator ACT of the machine tool 1 to change the state of the component COM. Specifically, the operator calls the control program 24 to transmit an instruction to the motor 15 to control the motor 15 to rotate at the rotation speed notified from the person in charge or the rotation speed notified at step S17 illustrated in FIGS. 3 and 4 (step S211). In the following description, this rotation speed will be referred to as remote diagnosis rotation speed. The controller 20 obtains a motor rotation speed at this moment from the encoder 16 and transmits the motor rotation speed to the remote monitor apparatus 9 (step S212). The remote monitor apparatus 9, by referring to the motor rotation speed transmitted from the controller 20, checks whether the motor 15 is rotating at the remote rotation speed (step S213).

After step S213, the remote monitor apparatus 9 transmits a second command to the signal processing device 3. The second command instructs detailed state-description data to be generated based on the signal. The detailed state-description data is for identifying the position of the abnormality in the component COM and is more informative than the rough state-description data (step S22). The signal processing device 3 receives the second command for the time during which the permission instruction permits the detailed state-description data to be transmitted to the remote monitor apparatus 9. The signal processing device 3 is configured to receive the second command for the time during which the permission instruction permits the detailed state-description data to be transmitted to the remote monitor apparatus 9. The following (i) to (iv) are examples of the second command.

(i) A command for transmitting the digital signal data 35, which is obtained by digitizing the signal from the sensor 14.

(ii) A command for subjecting the digital data of (i) to envelope processing and fast Fourier transformation to obtain a frequency spectrum and transmitting a resulting frequency spectrum.

(iii) A command for obtaining a root mean square value (RMS value) of all the frequency components from the frequency spectrum of (ii) and transmitting the RMS value.

(iv) A command for obtaining frequency components of any one of particular frequencies $f_A$, $f_B$, and $f_C$ from the frequency spectrum of (ii) and transmitting any one of the frequency components.

The commands (i) to (iv) can also be implemented using the script described above by referring to FIG. 4. For example, in (i), the second command can be implemented by a script that reads the output value of the "getData" function illustrated in FIG. 4 into the "sendData" function. In (ii), the second command can be implemented by a script that reads the output value of "getFFT" illustrated in FIG. 4 into the "sendData" function. In (iii), the second command can be implemented by a script that reads the output value of the "getRMScalue" function illustrated in FIG. 4 into the "sendData" function. In (iv), the second command can be implemented by a script that reads the output value of any one of the functions "getFrequencyData (fft, fa)", "getFrequencyData (fft, fb)", and "getFrequencyData (fft, fc)" illustrated in FIG. 4 into the "sendData" function. It is to be noted that these scripts are examples of the second command and that the second command may be implemented by any other method such as a binary code method. It is also to be noted that the second command may include a command other than the commands (i) to (iv).

Upon the signal processing device 3 receiving the second command, the signal processing device 3 performs, using the script engine 37, the processing described in the second command. Then, by a method similar to the rough diagnosis method, the signal processing device 3 transmits a sensor activation command to the sensor 14 (step S229). It is to be noted that step S229 may be omitted in a case where the sensor 14 continually outputs a sensor signal to the signal processing device 3, irrespective of the presence and absence of a sensor activation command. After the end of step S14, the signal processing device 3 generates rough state-description data based on the sensor signal. The rough state-description data is relevant to an occurrence of an abnormality in the component COM (step S25). Specifically, the signal processing device 3 performs an AD conversion (step S151) and generates detailed state-description data based on the signal (step S252). Specifically, upon receipt of the second command, the signal processing device 3 generates detailed state-description data based on the signal from the sensor 14. The detailed state-description data is for identifying the position of an abnormality in the component COM and is more informative than the rough state-description data.

Specifically, in a case where the second command is a command such as (i), the signal processing device 3 generates, as the detailed state-description data, digital data obtained by digitizing the signal from the sensor 14. In a case where the second command is a command such as (ii), the signal processing device 3 generates the frequency spectrum as the detailed state-description data. In a case where the second command is a command such as (iii), the signal processing device 3 generates the root mean square value as the detailed state-description data. In a case where the second command is a command such as (iv), the signal processing device 3 generates, as the detailed state-description data, the frequency components of any one of the particular frequencies $f_A$, $f_B$, and $f_C$. It is to be noted that in a case where the second command is a command such as (i), (ii), or (iv), the detailed state-description data includes a plurality of factors relevant to an abnormality in the component COM (for example, frequency components of any one of the particular frequencies $f_A$, $f_B$, and $f_C$) such that the plurality of factors are identifiable.

At step S26, the signal processing device 3 transmits the generated detailed state-description data to the remote monitor apparatus 9. More specifically, while the detailed state-description data is permitted by the permission instruction to be transmitted to the remote monitor apparatus 9, the signal processing device 3 transmits the generated detailed state-description data to the remote monitor apparatus 9. While the detailed state-description data is permitted by the permission instruction to be transmitted to the remote monitor apparatus 9, the signal processing device 3 is configured to transmit the generated detailed state-description data to the remote monitor apparatus 9. At step S27, when the remote monitor apparatus 9 analyzes detailed state-description data, the remote monitor apparatus 9 obtains the rough state-description data from the storage 7. Specifically, at step S271, the remote monitor apparatus 9 transmits a request message requesting the rough state-description data. This request message at least includes information (such as ID) for identifying the component COM and information specifying the period of time of the rough state-description data, which is the data to be transmitted. At step S272, the storage 7 transmits the rough state-description data specified by the request message to the remote monitor apparatus 9. It is to be noted that step S27 (steps S271 and S272) may be omitted. At step S28, the remote monitor apparatus 9 analyzes the state of the component COM using the received detailed state-description data and rough state-description data.

Effects of this Embodiment

In the machine tool 1, the diagnosis system 100, and the diagnosis method for the machine tool 1 according to this embodiment, sensor signal processing for abnormality diagnosis purposes is performed separately at the signal processing device 3, which is different from the controller 20. This ensures that rough abnormality diagnosis processing in the machine tool 1 and detailed abnormality diagnosis processing performed for the machine tool by a remote diagnosis device are both realized while preventing the load on the controller 20 from being significantly heavy. Also, by employing a centralized configuration in which input operations for the operations of the machine tool 1 and notifications of rough abnormality diagnosis results are both performed in the machine tool 1, operator-friendliness of rough abnormality diagnosis improves.

Modifications

The rough diagnosis rotation speed, the factor identification information 26, the threshold information 28, and the rough diagnosis script 36 may be replaceable with other data from the remote monitor apparatus 9. The synthesis information 27 may be replaceable by the remote monitor apparatus 9 with a template of a script describing other synthesis information 27 (in the script illustrated in FIG. 4, information that includes codes excluding the factor identification information 26 and the threshold information 28). The factor identification information 26, the synthesis information 27, and the threshold information 28 may be combined into one piece of information. As an example of such one piece of information, it is possible to store the rough diagnosis script 36 itself in the memory 22. Also, the rough diagnosis program 25, rough diagnosis rotation speed, the factor identification information 26, the synthesis information 27, and the threshold information 28 may be stored in the memory 22 as one rough diagnosis program 25. The rough diagnosis script 36 may be transmitted from other than the controller 20 to the signal processing device 3 and installed therein.

In the above-described embodiment, the component COM is the bearing 13, which supports the spindle 11. The component COM, however, may be any other part. The components COM may also be a greater configuration unit. For example, the component COM may be the spindle 11. The network 5 may not necessarily be a wired network but may be a wireless network. The communication network 53 may be replaced with a dedicated line or a telephone line to the manufacturer. In the above-described embodiment, a predetermined value is used as the rough diagnosis rotation speed. Another possible example is that the operator inputs the rough diagnosis rotation speed from the Input-Output device 17, and the rough diagnosis program 25 performs processing of generating the first command.

In the above-described embodiment, the frequency components of the particular frequencies $f_A$, $f_B$, and $f_C$ are not factors susceptible to an abnormal engagement between the plurality of parts. The frequency components of the particular frequencies, however, may include factors susceptible to an abnormal engagement between the plurality of parts. An example is a case where a holder has a defect while the rolling element 13B of the bearing 13 is being held in the holder (in a case where the rolling element 13B is making an orbital rotation about the rotation axis of the motor 15 while being displaced from the intended position of the rolling element 13B). In this case, the frequency component of the following frequency $f_D$ is susceptible to the defect. The plurality of factors relevant to an abnormality in the component COM may include the frequency component of the frequency $f_D$ as a factor susceptible to an abnormal engagement between the plurality of parts.

$$f_D=(\mathrm{No}/120)\cdot(1-d\cdot\cos\,\alpha/D) \quad (4)$$

At least one or all of the functions of the control program 24, the rough diagnosis program 25, and the security program 29 may be implemented by a dedicated processor and/or an integrated circuit. The control program 24, the rough diagnosis program 25, and the security program 29 may not necessarily be stored in the memory 22, which is incorporated in to the controller 20; these programs may be recorded in a storage medium removable from the controller 20 and readable into the controller 20. Examples of the storage medium include: a disc such as a floppy disc (diskette), an optical disc, a CD-ROM, and a magnetic disc; an SD card; a USB memory; and an external hard disc. It is to be noted that the controller 20 is an example of the computer.

A machine tool according to the first embodiment of the present disclosure includes a component, a sensor, a signal processing device, a controller, and an Input-Output device. The component is variable in state based on an operation of an actuator of the machine tool. The sensor is configured to detect the state of the component. The signal processing device is configured to process a signal from the sensor. The controller is configured to control the operation of the actuator. The Input-Output device is configured to receive an instruction for the controller to control the actuator to conduct the operation. The Input-Output device is configured to notify an operation status of the actuator. The signal processing device is configured to, based on the signal, generate rough state-description data relevant to an occurrence of an abnormality in the component, and configured to transmit the generated rough state-description data to the controller. The signal processing device is configured to, based on the signal, generate detailed state-description data that is for identifying an abnormal part in the component and that is more informative than the rough state-description data. The signal processing device is configured to transmit the generated detailed state-description data to a remote monitor apparatus that is configured to analyze the state of the component. Based on the rough state-description data transmitted to the controller, the Input-Output device is configured to notify an operator of whether the abnormality is occurring in the component.

According to a second embodiment of the present disclosure, in the machine tool according to the first embodiment, the controller is configured to transmit a first command to the signal processing device to control the signal processing device to generate the rough state-description data based on the signal. The signal processing device is configured to generate the rough state-description data upon receipt of the first command, and configured to transmit the generated rough state-description data to the controller.

According to a third embodiment of the present disclosure, in the machine tool according to the first or second embodiment, the remote monitor apparatus is configured to transmit a second command to the signal processing device to control the signal processing device to generate the detailed state-description data based on the signal. The signal processing device is configured to generate the detailed state-description data upon receipt of the second command, and configured to transmit the generated detailed state-description data to the remote monitor apparatus.

According to a fourth embodiment of the present disclosure, the machine tool according to the third embodiment further includes a communication line connecting the controller and the signal processing device to each other. The remote monitor apparatus is connected to the signal processing device via a communication network. A gateway is provided between the signal processing device and the remote monitor apparatus. The first command and the rough state-description data are transmitted via the communication line. The second command and the detailed state-description data are transmitted via the communication network. Preferably, communication capacity of the communication line is smaller than communication capacity of the communication network. The communication capacity of the communication line, however, may be equal to or larger than the communication capacity of the communication network.

According to a fifth embodiment of the present disclosure, in the machine tool according to any one of the second to fourth embodiments, the first command includes at least one of a program code and an execution command. The program code is for generating the rough state-description data based on the signal. The execution command is for executing the program code transmitted from the controller to the signal processing device and stored in the signal processing device.

According to a sixth embodiment of the present disclosure, in the machine tool according to the fifth embodiment, the program code includes factor identification information and synthesis information. The factor identification information is for identifying a plurality of factors of the signal transmitted from the sensor, the plurality of factors being relevant to the abnormality in the component. The synthesis information specifies a synthesis method of synthesizing at least two factors of the plurality of factors with each other. Upon execution of the program code, the signal processing device is configured to extract the plurality of factors from the signal, and configured to synthesize the at least two factors with each other according to the synthesis method to obtain a synthesis value.

According to a seventh embodiment of the present disclosure, in the machine tool according to the sixth embodiment, the rough state-description data includes the synthesis value.

According to an eighth embodiment of the present disclosure, in the machine tool according to the fifth or seventh embodiment, the program code includes a threshold for determining the abnormality in the component. Upon execution of the program code, the signal processing device is configured to, based on the plurality of factors and the threshold, determine whether the abnormality is occurring in the component. The rough state-description data includes information indicating whether the abnormality is occurring in the component.

According to a ninth embodiment of the present disclosure, in the machine tool according to any one of the sixth to eighth embodiments, the component includes a plurality of parts. The abnormality includes a plurality of abnormalities including a damage to the plurality of parts and an abnormal engagement between the plurality of parts. Each of the plurality of abnormalities is indicated by at least one of the plurality of factors.

According to a tenth embodiment of the present disclosure, in the machine tool according to the ninth embodiment, The detailed state-description data includes the plurality of factors such that each of the plurality of factors is identifiable.

According to an eleventh embodiment of the present disclosure, in the machine tool according to the ninth or tenth embodiment, the plurality of parts include an inner ring, an outer ring, and a rolling element of a bearing provided in the component. The sensor is a vibration sensor configured to detect a vibration of the bearing. The plurality of factors include a factor that corresponds to a first frequency of the signal from the vibration sensor and that is susceptible to a damage to the inner ring. The plurality of factors include a factor that corresponds to a second frequency of the signal from the vibration sensor and that is susceptible to a damage to the outer ring. The plurality of factors include a factor that corresponds to a third frequency of the signal from the vibration sensor and that is susceptible to a damage to the rolling element. The factor identification information includes information for identifying the first frequency, the second frequency, and the third frequency.

According to a twelfth embodiment of the present disclosure, in the machine tool according to the third or fourth embodiment, a permission instruction is input to the machine tool via the Input-Output device to permit the detailed state-description data to be output to the remote monitor apparatus. While the detailed state-description data is permitted by the permission instruction to be transmitted to the remote monitor apparatus, the signal processing device is configured to receive the second command and transmit the detailed state-description data to the remote monitor apparatus.

A diagnosis system for a machine tool according to a thirteenth embodiment of the present disclosure includes the machine tool according to any one of the first to twelfth embodiments, a remote monitor apparatus, a communication network connecting the remote monitor apparatus and the signal processing device to each other, and a gateway provided between the remote monitor apparatus and the signal processing device on the communication network.

According to a fourteenth embodiment of the present disclosure, the diagnosis system according to the thirteenth embodiment further includes a storage accessible by the remote monitor apparatus via the communication network. The controller is configured to transmit the rough state-description data to the storage. The storage is configured to store sets of the rough state-description data for each of a plurality of the components such that the sets of the rough state-description data are searchable on a time-series basis. The remote monitor apparatus is configured to obtain the rough state-description data from the storage when the remote monitor apparatus analyzes the detailed state-description data.

A method of diagnosing a machine tool according to the fifteenth embodiment of the present disclosure includes, based on an input via an Input-Output device of the machine tool, driving an actuator of the machine tool to change a state of a component of the machine tool, detecting the state of the component using a sensor, transmitting, to a signal processing device of the machine tool, a signal indicating the state detected by the sensor, based on the signal and using the signal processing device, generating rough state-description data relevant to an occurrence of an abnormality in the component, transmitting the generated rough state-description data to a controller that is configured to control an operation of the actuator, based on the signal and using the signal processing device, generating detailed state-description data that is for identifying an abnormal part in the component and that is more informative than the rough state-description data, transmitting the generated detailed state-description data to a remote monitor apparatus that is configured to analyze the state of the component, and via the Input-Output device and based on the rough state-description data transmitted to the controller, notifying an operator of whether the abnormality is occurring in the component.

According to a sixteenth embodiment of the present disclosure, the diagnosis method according to the fifteenth embodiment further includes, using the controller, transmitting a first command to the signal processing device to cause the signal processing device to generate the rough state-description data based on the signal. The signal processing device generates the rough state-description data upon receipt of the first command, and transmits the generated rough state-description data to the controller.

According to a seventeenth embodiment of the present disclosure, the diagnosis method according to the fifteenth or sixteenth embodiment further includes, using the remote monitor apparatus, transmitting a second command to the signal processing device to control the signal processing device to generate detailed state-description data based on the signal. The signal processing device generates the detailed state-description data upon receipt of the second command, and transmits the generated detailed state-description data to the remote monitor apparatus.

According to an eighteenth embodiment of the present disclosure, in the diagnosis method according to the seventeenth embodiment, the first command and the rough state-description data are transmitted via a communication line connecting the controller and the signal processing device to each other. The second command and the detailed state-description data are transmitted via a communication network connecting the remote monitor apparatus and the signal processing device to each other. A gateway is provided between the signal processing device and the remote monitor apparatus. Preferably, communication capacity of the communication line is smaller than communication capacity of the communication network. The communication capacity of the communication line, however, may be equal to or larger than the communication capacity of the communication network.

According to a nineteenth embodiment of the present disclosure, in the diagnosis method according to any one of the sixteenth to eighteenth embodiments, the first command includes at least one of a program code and an execution command. The program code is for generating the rough state-description data based on the signal. The execution command is for executing the program code transmitted from the controller to the signal processing device and stored in the signal processing device.

According to a twentieth embodiment of the present disclosure, in the diagnosis method according to the nineteenth embodiment, the program code includes factor identification information and synthesis information. The factor identification information is for identifying a plurality of factors relevant to the abnormality in the component. The synthesis information specifies a synthesis method of synthesizing at least two factors of the plurality of factors with each other. Upon execution of the program code, the signal processing device extracts the plurality of factors from the signal, and configured to synthesize the at least two factors with each other according to the synthesis method to obtain a synthesis value.

According to a twenty-first embodiment of the present disclosure, in the diagnosis method according to the twentieth embodiment, the rough state-description data includes the synthesis value.

According to a twenty-second embodiment of the present disclosure, in the diagnosis method according to any one of the nineteenth to twenty-first embodiments, the program code includes a threshold for determining the abnormality in the component. Upon execution of the program code, based on the plurality of factors and the threshold, the signal processing device determines whether the abnormality is occurring in the component. The rough state-description data includes information indicating whether the abnormality is occurring in the component.

According to a twenty-third embodiment of the present disclosure, in the diagnosis method according to any one of the twentieth to twenty-second embodiments, the component includes a plurality of parts. The abnormality includes a plurality of abnormalities including a damage to the plurality of parts and an abnormal engagement between the plurality of parts, and each of the plurality of abnormalities is indicated by at least one of the plurality of factors.

According to a twenty-fourth embodiment of the present disclosure, in the diagnosis method according to the twenty-third embodiment. The detailed state-description data includes the plurality of factors such that each of the plurality of factors is identifiable.

According to a twenty-fifth embodiment of the present disclosure, in the diagnosis method according to the twenty-third embodiment or the twenty-fourth embodiment, the plurality of parts include an inner ring, an outer ring, and a rolling element of a bearing provided in the component. The sensor is a vibration sensor configured to detect a vibration of the bearing. The plurality of factors include a factor that corresponds to a first frequency of the signal from the vibration sensor and that is susceptible to a damage to the inner ring. The plurality of factors include a factor that corresponds to a second frequency of the signal from the vibration sensor and that is susceptible to a damage to the outer ring. The plurality of factors include a factor that corresponds to a third frequency of the signal from the vibration sensor and that is susceptible to a damage to the rolling element. The factor identification information includes information for identifying the first frequency, the second frequency, and the third frequency.

According to a twenty-sixth embodiment of the present disclosure, the diagnosis method according to the seventeenth or eighteenth embodiment includes inputting a permission instruction to the machine tool via the Input-Output device to permit the detailed state-description data to be output to the remote monitor apparatus. While the detailed state-description data is permitted by the permission instruction to be transmitted to the remote monitor apparatus, the signal processing device receives the second command and transmits the detailed state-description data to the remote monitor apparatus.

According to a twenty-seventh embodiment of the present disclosure, the diagnosis method according to any one of the fifteenth to twenty-sixth embodiments further includes, using the controller, transmitting the rough state-description data to a storage accessible by the remote monitor apparatus via the communication network. Using the storage, sets of the rough state-description data are stored for each of a plurality of the components such that the sets of the rough state-description data are searchable on a time-series basis. The remote monitor apparatus obtains the rough state-description data from the storage when the remote monitor apparatus analyzes the detailed state-description data.

In the machine tool according to the first embodiment, in the diagnosis system according to the thirteenth embodiment including the machine tool according to the first embodiment, and in the method according to the fifteenth embodiment of diagnosing a machine tool, the signal processing of processing a signal from the sensor for abnormality diagnosis purposes is performed at the signal processing device, and the signal processing device is separate from the controller of the machine tool. Thus, rough abnormality diagnosis processing performed by the machine tool and detailed abnormality diagnosis processing performed for the machine tool by a remote diagnosis device are both realized while preventing the load on the controller from being significantly heavy. Also, a centralized configuration is employed in which input operations for machine tool operations and notifications of rough abnormality diagnosis results are both performed in the machine tool. As a result, operator-friendliness of rough abnormality diagnosis and detailed abnormality diagnosis improves.

In the machine tool according to the second embodiment, in the diagnosis system according to the thirteenth embodiment including the machine tool according to the second embodiment, and in the method according to the sixteenth embodiment of diagnosing a machine tool, a rough abnormality diagnosis can be performed using a commercially available signal processing device capable of processing an external command. As a result, the cost of machine tool production reduces.

In the machine tool according to the third embodiment, in the diagnosis system according to the thirteenth embodiment including the machine tool according to the third embodiment, and in the method according to the seventeenth embodiment of diagnosing a machine tool, the remote monitor apparatus is capable of analyzing the output from the sensor in any desired manner. Also, a detailed abnormality diagnosis can be performed using a commercially available signal processing device capable of processing an external command. As a result, the cost of machine tool production reduces.

In the machine tool according to the fourth embodiment, in the diagnosis system according to the thirteenth embodiment including the machine tool according to the fourth embodiment, and in the method according to the eighteenth embodiment of diagnosing a machine tool, the signal processing device is capable of transmitting the second command and the detailed state-description data without the intervention of the controller. This reduces the load on the controller. Also, the rough state-description data is smaller in information amount than the detailed state-description data. This makes communication capacity of the communication line smaller than communication capacity of the communication network, ensuring that a various kinds of lines can be used as the communication line.

In the machine tool according to the fifth embodiment, in the diagnosis system according to the thirteenth embodiment including the machine tool according to the fifth embodiment, and in the method according to the nineteenth embodiment of diagnosing a machine tool, a program code for generating the rough state-description data based on the signal is transmitted from the controller to the signal processing device. In this manner, the code can be executed under the control of the controller. This ensures that the algorithm of the rough abnormality diagnosis can be flexibly changed.

In the machine tool according to the sixth embodiment, in the diagnosis system according to the thirteenth embodiment including the machine tool according to the sixth embodiment, and in the method according to the twentieth embodiment of diagnosing a machine tool, a plurality of factors relevant to an abnormality in the component are used to make a determination on the abnormality in the component. This ensures that a determination on an abnormality in the component can be made highly accurately. Also, a synthesis value is generated by synthesizing at least two factors of the plurality of factors with each other. This ensures that a determination on an abnormality in the component can be made according to a rough determination method.

In the machine tool according to the seventh embodiment, in the diagnosis system according to the thirteenth embodiment including the machine tool according to the seventh embodiment, and in the method according to the twenty-first embodiment of diagnosing a machine tool, the synthesis value can be output to the Input-Output device. This ensures that the operator of the machine tool can be notified of the degree of abnormality.

In the machine tool according to the eighth embodiment, in the diagnosis system according to the thirteenth embodiment including the machine tool according to the eighth embodiment, and in the method according to the twenty-second embodiment of diagnosing a machine tool, information indicating whether an abnormality is occurring in the component can be output to the Input-Output device. This ensures that the operator of the machine tool can be notified of whether an abnormality is occurring in the component.

In the machine tool according to the ninth embodiment, in the diagnosis system according to the thirteenth embodiment including the machine tool according to the ninth embodiment, and in the method according to the twenty-third embodiment of diagnosing a machine tool, a determination on an abnormality in the component can be made accurately using a plurality of factors each indicating each of a plurality of abnormalities including a damage to the plurality of parts and an abnormal engagement between the plurality of parts.

In the machine tool according to the tenth embodiment, in the diagnosis system according to the thirteenth embodiment including the machine tool according to the tenth embodiment, and in the method according to the twenty-fourth embodiment of diagnosing a machine tool, abnormalities including a damage to the plurality of parts and an abnormal engagement between the plurality of parts can be determined by the remote monitor apparatus.

In the machine tool according to the eleventh embodiment, in the diagnosis system according to the thirteenth embodiment including the machine tool according to the eleventh embodiment, and in the method according to the twenty-fifth embodiment of diagnosing a machine tool, an abnormality of an inner ring, an abnormality of an outer ring, and an abnormality of a rolling element of a bearing can be determined independently by the remote monitor apparatus.

In the machine tool according to the twelfth embodiment, in the diagnosis system according to the thirteenth embodiment including the machine tool according to the twelfth embodiment, and in the method according to the twenty-sixth embodiment of diagnosing a machine tool, the operator of the machine tool is able to control the remote monitor apparatus's access to the signal processing device.

In the diagnosis system according to the fourteenth embodiment and in the method according to the twenty-seventh embodiment of diagnosing a machine tool, the remote monitor apparatus is capable of referring to the time-series rough state-description data when the remote monitor apparatus analyzes the detailed state-description data. This enables the remote monitor apparatus to analyze the state of the component in detail.

In the present application, the term “comprise” and its variations are intended to mean open-ended terms, not excluding any other elements and/or components that are not recited herein. The same applies to the terms “include”, “have”, and their variations.

Also in the present application, a component suffixed with a term such as “member”, “portion”, “part”, “element”, “body”, and “structure” is intended to mean that there is a single such component or a plurality of such components.

Also in the present application, ordinal terms such as “first” and “second” are merely used for distinguishing purposes and there is no other intention (such as to connote a particular order) in using ordinal terms. For example, the mere use of “first element” does not connote the existence of “second element”; otherwise, the mere use of “second element” does not connote the existence of “first element”.

In the present application, approximating language such as “approximately”, “about”, and “substantially” may be applied to modify any quantitative representation that could permissibly vary without a significant change in the final result obtained. All of the quantitative representations recited in the present application shall be construed to be modified by approximating language such as “approximately”, “about”, and “substantially”.

Also in the present application, the phrase “at least one of A and B” is intended to be interpreted as “only A”, “only B”, or “both A and B”.

Obviously, numerous modifications and variations of the present invention are possible in light of the above teachings. It is therefore to be understood that within the scope of the appended claims, the present invention may be practiced otherwise than as specifically described herein.

What is claimed is:

1. A machine tool comprising:

a user interface configured to receive an instruction;

a motor configured to rotate a spindle based on the instruction;

a spindle case rotatably supporting the spindle via a bearing;

control circuitry configured to control of the motor based on the instruction;

a vibration sensor configured to detect vibration of at least one device including the spindle, the bearing or the spindle case;

a computer connected to the control circuitry via an external communication interface, the computer being configured to receive a signal from the vibration sensor, generate, based on the signal, rough state-description data relevant to an occurrence of an abnormality in the at least one device, transmit the rough state-description data to the control circuitry, generate detailed state-description data based on the signal, the detailed state-description data being more informative than the rough state-description data such that the detailed state-description data facilitates identifying an abnormal part in the at least one device, and transmit the detailed state-description data to a monitoring computer via a communication network, the monitoring computer being configured to analyze the vibration of the at least one device; and an indicator output interface configured to notify an operator of whether the abnormality is occurring in the at least one device based on the rough state-description data transmitted to the control circuitry, wherein the control circuitry is configured to transmit a first command to the computer to control the computer to generate the rough state-description data based on the signal, wherein the computer is configured to generate the rough state-description data upon receipt of the first command and to transmit the rough state-description data to the control circuitry, wherein the first command comprises a program code instructed to generate the rough state-description data based on the signal, wherein the program code comprises factor identification information by which a plurality of factors of the signal from the vibration sensor are identified, the plurality of factors being relevant to the abnormality in the at least one device, and synthesis information specifying a synthesis method according to which at least two factors of the plurality of factors are synthesized with each other, and wherein upon execution of the program code, the computer is configured to extract the plurality of factors from the signal and to synthesize the at least two factors with each other according to the synthesis method to obtain a synthesis value.

2. The machine tool according to claim 1, wherein the monitoring computer is configured to transmit a second command to the computer to control the computer to generate the detailed state-description data based on the signal, and wherein the computer is configured to generate the detailed state-description data upon receipt of the second command and to transmit to the monitoring computer, the detailed state-description data that are generated.

3. The machine tool according to claim 2, further comprising a communication line connecting the control circuitry and the computer to each other, wherein a gateway is provided between the computer and the monitoring computer in the communication network, wherein the first command and the rough state-description data are transmitted via the communication line, wherein the second command and the detailed state-description data are transmitted via the communication network, and wherein communication capacity of the communication line is smaller than communication capacity of the communication network has.

4. The machine tool according to claim 1, wherein the first command further comprises an execution command to execute the program code that has been transmitted from the control circuitry to the computer and has been stored in the computer.

5. The machine tool according to claim 1, wherein the rough state-description data comprise the synthesis value.

6. The machine tool according to claim 1, wherein the program code comprises a threshold based on which the abnormality in the at least one device is determined, wherein upon execution of the program code, the computer is configured to, based on the plurality of factors and the threshold, determine whether the abnormality is occurring in the at least one device, and wherein the rough state-description data comprise information indicating whether the abnormality is occurring in the at least one device.

7. The machine tool according to claim 1, wherein the at least one device comprises a plurality of parts, wherein the abnormality comprises a plurality of defects including a plurality of damages to the plurality of parts respectively and an abnormal engagement between the plurality of parts, and wherein each of the plurality of defects is indicated by at least one of the plurality of factors.

8. The machine tool according to claim 7, wherein the detailed state-description data comprise the plurality of factors such that each of the plurality of factors is identifiable.

9. The machine tool according to claim 7, wherein the plurality of parts comprise an inner ring, an outer ring, and a rolling element of the bearing, wherein the vibration sensor is configured to detect the vibration of the bearing, wherein the plurality of factors comprise a frequency component of a first frequency of the signal from the vibration sensor and that is susceptible to a damage to the inner ring, a frequency component of a second frequency of the signal from the vibration sensor and that is susceptible to a damage to the outer ring, and a frequency component of a third frequency of the signal from the vibration sensor and that is susceptible to a damage to the rolling element, and wherein the factor identification information comprises information identifying the first frequency, the second frequency, and the third frequency.

10. The machine tool according to claim 2, wherein a permission instruction to permit the detailed state-description data to be output to the monitoring computer is input via the user interface, and wherein while the detailed state-description data is permitted by the permission instruction to be transmitted to the monitoring computer, the computer is configured to receive the second command and transmit the detailed state-description data to the monitoring computer.

11. A diagnosis system comprising:

the machine tool according to claim 2;

the monitoring computer;

the communication network connecting the monitoring computer and the computer to each other; and a gateway provided between the monitoring computer and the computer on the communication network.

12. The diagnosis system according to claim 11, wherein a permission instruction to permit the detailed state-description data to be output to the monitoring computer is input via the user interface, wherein while the detailed state-description data is permitted by the permission instruction to be transmitted to the monitoring computer, the gateway enables communication between the monitoring computer and the computer such that the computer receives the second command and transmits the detailed state-description data to the monitoring computer, and wherein while the detailed state-description data is disallowed by the permission instruction to be transmitted to the monitoring computer, the gateway blocks communication between the monitoring computer and the computer.

13. The diagnosis system according to claim 11, further comprising a storage accessible by the monitoring computer via the communication network, wherein the control circuitry is configured to transmit the rough state-description data to the storage, wherein the storage is configured to store sets of the rough state-description data for each of a plurality of the components such that the sets of the rough state-description data are searchable on a time-series basis, and wherein the monitoring computer is configured to obtain the rough state-description data from the storage when the monitoring computer analyzes the detailed state-description data.

14. A method of diagnosing a machine tool, the method comprising:

receiving an input to cause control circuitry of the machine tool to drive a motor of the machine tool based on the input to rotate a spindle of the machine tool to cause vibration of at least one device of the machine tool, the at least one device including the spindle, a spindle case of the machine tool rotatably supporting the spindle, and a bearing provided between the spindle and the spindle case;

detecting the vibration of the at least one device;

transmitting a signal indicating the vibration detected to a computer of the machine tool;

transmitting a first command to the computer to control the computer to generate rough state-description data based on the signal, the rough state-description data being relevant to an occurrence of an abnormality in the at least one device;

transmitting a second command to the computer to control the computer to generate detailed state-description data based on the signal, the detailed state-description data being more informative than the rough state-description data such that the detailed state-description data facilitates identifying an abnormal part in the at least one device;

transmitting the rough state-description data from the computer to the control circuitry via an external communication interface;

transmitting the detailed state-description data from the computer to a monitoring computer via a communication network, the monitoring computer being configured to analyze the vibration of the at least one device; and notifying an operator of whether the abnormality is occurring in the at least one device based on the rough state-description data transmitted to the control circuitry, wherein the first command comprises a program code instructed to generate the rough state-description data based on the signal, wherein the program code comprises factor identification information by which a plurality of factors of the signal are identified, the plurality of factors being relevant to the abnormality in the at least one device, and synthesis information specifying a synthesis method according to which at least two factors of the plurality of factors are synthesized with each other, and wherein upon execution of the program code, the computer is controlled to extract the plurality of factors from the signal and to synthesize the at least two factors with each other according to the synthesis method to obtain a synthesis value.

15. A diagnosis system comprising:

the machine tool according to claim 1;

the monitoring computer;

the communication network connecting the monitoring computer and the computer to each other; and a gateway provided between the monitoring computer and the computer on the communication network.

* * * * *